(12) United States Patent
Goodnow et al.

(10) Patent No.: US 7,732,949 B2
(45) Date of Patent: Jun. 8, 2010

(54) SYSTEM FOR METHOD OF PREDICTING POWER EVENTS IN AN INTERMITTENT POWER ENVIRONMENT AND DISPATCHING COMPUTATIONAL OPERATIONS OF AN INTEGRATED CIRCUIT ACCORDINGLY

(75) Inventors: Kenneth J. Goodnow, Essex, VT (US); Clarence R. Ogilvie, Huntington, VT (US); Sebastian T. Ventrone, S. Burlington, VT (US); Keith R. Williams, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 11/550,573

(22) Filed: Oct. 18, 2006

(65) Prior Publication Data

US 2008/0189567 A1 Aug. 7, 2008

(51) Int. Cl.
*G05F 3/06* (2006.01)
*G06F 1/00* (2006.01)

(52) U.S. Cl. .................. 307/151; 713/300; 713/310; 713/320; 713/340

(58) Field of Classification Search ............... 713/300, 713/310, 320, 340; 700/44, 286, 291; 307/151
See application file for complete search history.

(56) References Cited

U.S. PATENT DOCUMENTS 6,721,892 B1 4/2004 Osborn et al.
6,775,787 B2 8/2004 Greene
7,539,882 B2 * 5/2009 Jessup et al. ................ 713/300

\* cited by examiner

*Primary Examiner*—Shawn Riley
(74) *Attorney, Agent, or Firm*—Downs Rachlin Martin PLLC

(57) ABSTRACT

A system and method of predicting power events in intermittent power environments and dispatching computational operations of an integrated circuit accordingly. A power management prediction system includes a controller executing a prediction algorithm, an arrangement of computation circuitry, a non-volatile storage device containing a power requirements log and a power history log, a clock generator, an intermittent power source, and a power monitor circuit. A method of predicting intermittent power events and dispatching computational operations includes: storing power requirements of each computational operation, monitoring the intermittent power source to generate a history log, predicting a subsequent power event based on the history log, retrieving actual power requirements of one or more computational operations, comparing the predicted power event with actual power requirements, determining whether actual power requirements are satisfied, dispatching one or more computational operations that correspond to one or more actual power events, or performing an error recovery operation.

20 Claims, 4 Drawing Sheets

Process dispatch table 60 

```
POWER CYCLE    ----->   TTTTTTTTTTTTTTTTTTTTTTTTTTTTTTTTTTTTTT
                        000000000111111111122222222223333333333
                        123456789012345678901234567890123456789
                        | | | | | | | | | | | | | | | | | | | | | | | | | | | | | | | | | | | | | |
AVAILABLE PWR UNITS     000005555500000555550000055555500000
SUB-UNITS EXECUTED      -----AABBCC-----DDDEEE-----FFF-------
CONSUMED PWR UNITS      000005555500000555550000055500000000
SURPLUS PWR UNITS       000000000000000000000000000555000000
```

FIG. 2A

Process dispatch table 62 

```
POWER CYCLE    ----->   TTTTTTTTTTTTTTTTTTTTTTTTTTTTTTTTTTTTTT
                        000000000111111111122222222223333333333
                        123456789012345678901234567890123456789
                        | | | | | | | | | | | | | | | | | | | | | | | | | | | | | | | | | | | | | |
AVAILABLE PWR UNITS     000005555500000555550000055555500000
SUB-UNITS EXECUTED      -----AADDD------BBEEE------CCFFF------
CONSUMED PWR UNITS      000005555000005555000005555500000
SURPLUS PWR UNITS       000000000500000000050000000000500000
```

FIG. 2B

Process dispatch table 64

```
POWER CYCLE ----->   TTTTTTTTTTTTTTTTTTTTTTTTTTTTTTTTTTTTTT
                     000000000011111111112222222222333333
                     123456789012345678901234567890123456 7
                     | | | | | | | | | | | | | | | | | | | | | | | | | | | | | | | | | | | | | |
AVAILABLE PWR UNITS  000013575310000135753100001357531 0000
   SUB-UNITS EXECUTED -----AABB-------CC---------------- --
   SUB-UNITS EXECUTED ------DDD--------EEE--------FFF-- ----
   CONSUMED PWR UNITS 000002555000000025330000000333000 0000
     SURPLUS PWR UNITS 000011020310000110423100001024531 0000
```

*FIG. 3A*

Process dispatch table 66

```
POWER CYCLE ----->   TTTTTTTTTTTTTTTTTTTTTTTTTTTTTTTTTTTTTT
                     000000000011111111112222222222333333
                     1234567890123456789012345678901234567
                     | | | | | | | | | | | | | | | | | | | | | | | | | | | | | | | | | | | | |
AVAILABLE PWR UNITS  00001357531000013575310000135753 10000
   SUB-UNITS EXECUTED -----AA----------BB-----------CC----- ---
   SUB-UNITS EXECUTED ------DDD--------EEE--------FFF------
   CONSUMED PWR UNITS 000002533000000025330000000253300 0000
     SURPLUS PWR UNITS 000011042310000110423100001104231 0000
```

*FIG. 3B*

Process dispatch table 68

```
POWER CYCLE ----->   TTTTTTTTTTTTTTTTTTTTTTTTTTTTTTTTTTTTTT
                     000000000011111111112222222222333333
                     1234567890123456789012345678901234567
                     | | | | | | | | | | | | | | | | | | | | | | | | | | | | | | | | | | | | | |
AVAILABLE PWR UNITS  00001357531000013575310000135753 10000
   SUB-UNITS EXECUTED -----AADDD------BBEEE------CCFFF-----
   CONSUMED PWR UNITS 00000223330000002233300000022333 00000
     SURPLUS PWR UNITS 00001134201000011342010000113420 10000
```

*FIG. 3C*

SYSTEM FOR METHOD OF PREDICTING POWER EVENTS IN AN INTERMITTENT POWER ENVIRONMENT AND DISPATCHING COMPUTATIONAL OPERATIONS OF AN INTEGRATED CIRCUIT ACCORDINGLY

FIELD OF THE INVENTION

The present invention generally relates to the field of integrated circuits that operate in an intermittent power environment. In particular, the present invention is directed to a system for and method of predicting power events in an intermittent power environment and dispatching computational operations of an integrated circuit accordingly.

BACKGROUND

In many contexts the use of batteries, large capacitors, or other constant power sources is impractical due to cost, weight, size, capability, and other factors. Environmental scavenging of power or energy may provide an alternative to such constant power sources. However, such environmental power sources may not be continuous i.e., they provide an intermittent or periodic power environment. For example, remote sensing devices may operate via solar power, which may be variable. In another example, radio frequency identification (RFID) tag devices may be energized via RF pulses, that occur intermittently rather than continuously.

Due to the unknown signature and unpredictability of intermittent power sources, power storage in an integrated circuit device may not be realistic in certain intermittent power environments. For example, in certain conditions the power from an intermittent power source may not be of sufficient duration to power a selected computational operation within an integrated circuit. Therefore, in intermittent power environments, one must consider the paradigm of intermittent processing and inherent associated problems. One such problem is how to determine the best sequence of processes to execute in a given power cycle and, thereby, maximize the operation of an integrated circuit device in a given power cycle.

SUMMARY OF THE DISCLOSURE

One aspect of the present disclosure is a power management prediction system for use with a power source that produces power events. The system includes: a monitor connectable to the power source for monitoring the power source and producing a power history table of power events previously produced by the power source; computation circuitry; a power requirements table containing power requirements information for the computational circuitry; and a controller connected to the power history table and the power requirements table, the controller calculating a predicted power cycle based on the power events in the power history table and enabling power to the computation circuitry based on the predicted power cycle and the power requirements information.

Another aspect of the present disclosure is a power system with power management prediction capabilities. The power system includes an intermittent power source; a power monitor connected connectable to the intermittent power source for monitoring the intermittent power source and producing a power history table of power events previously produced by the intermittent power source; computation circuitry having a plurality of sub-units, wherein the computation circuitry is powered by the intermittent power source; a power requirements table containing power requirements information for the plurality of sub-units in the computational circuitry; and a controller connected to the power history table and the power requirements table, the controller calculating a predicted power cycle based on the power events in the power history table and enabling power to the plurality of sub-units in the computation circuitry based on the predicted power cycle and the power requirements information.

Yet another aspect of the present disclosure is a method of managing power prediction for computational operations. The method includes: storing a set of power requirements for one or more computational operations; monitoring a power source and creating a power history table of power events previously produced by the power source; predicting a subsequent power event based on power events in the power history table; retrieving the set of power requirements for the one or more computational operations; and comparing the set of power requirements with power events in the power history table to determine if the set of power requirements are met for the one or more computational operations.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A and 2B illustrate first and second process dispatch tables, respectively, for a first power sequence;

FIGS. 3A, 3B, and 3C illustrate first, second, and third process dispatch tables, respectively, for a second power sequence.

DETAILED DESCRIPTION

The present disclosure provides a low-power architecture system that accepts intermittent or periodic power inputs with an unknown signature. The present disclosure also provides a method of predicting the most efficient dispatching of the intermittent power.

Figure 1:
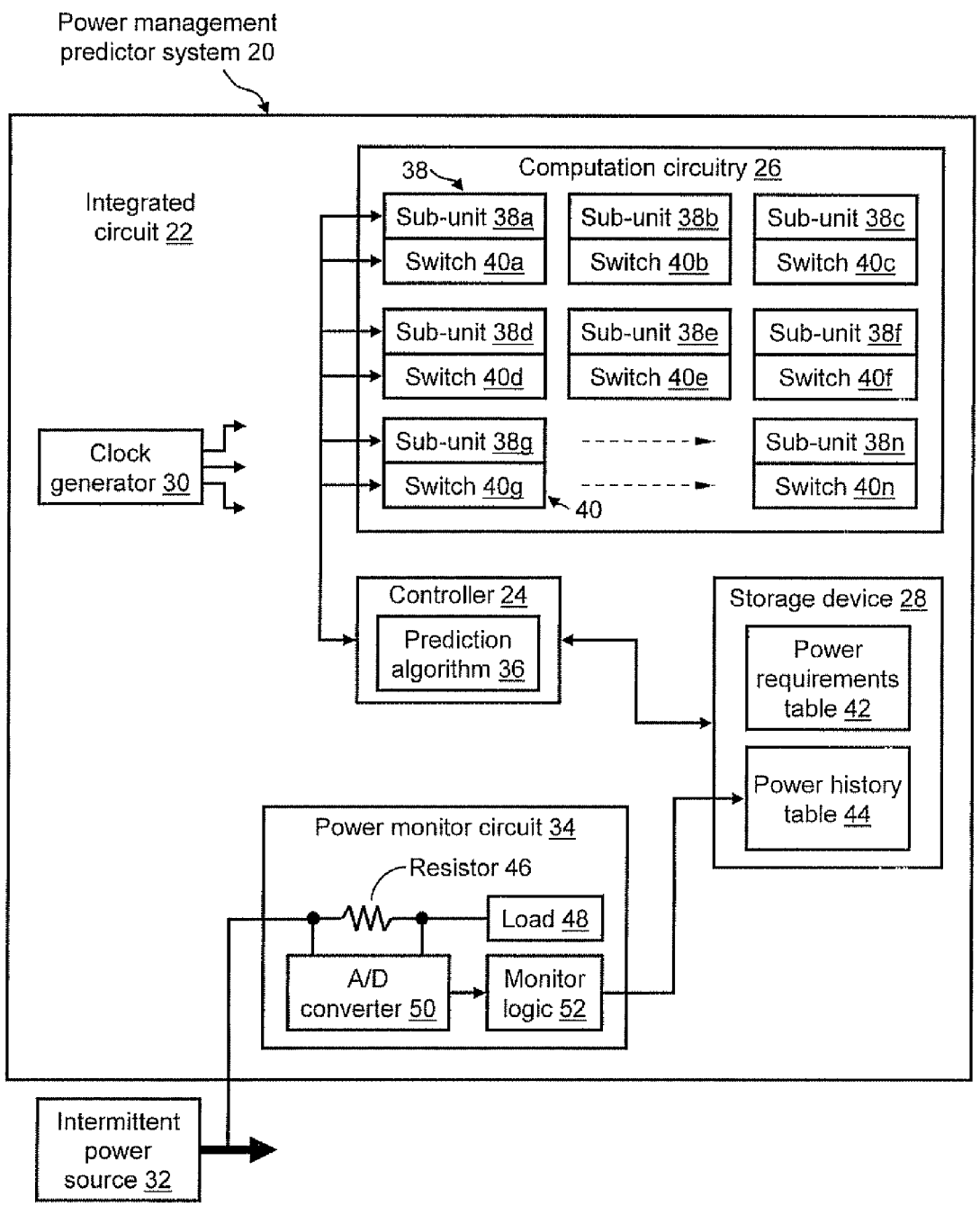
FIG. 1 illustrates a functional block diagram of a power management prediction system for operating in an intermittent power environment.

FIG. 1 illustrates a functional block diagram of one embodiment of a power management prediction system 20 for operating in an intermittent power environment. Power management prediction system 20 may be implemented within an integrated circuit 22 or any electronic device operating in the intermittent power environment. In one example, integrated circuit 22 may be, but is not limited to, an RFID tag, that is a wireless microchip upon which data or information is stored, for example, a unique digital identification number, as is well known in the art. The microchip of the RFID tag may be attached to an antenna (not shown) and, thus, the RFID tag is energized (i.e., powered) via RF pulses, which may occur intermittently rather than continuously. Thus, RF pulses are merely one example of an intermittent power source.

Integrated circuit 22 may include a controller 24, an arrangement of computation circuitry 26, a storage device 28, a clock generator 30, and a power monitor circuit 34. Integrated circuit 22 may be connected with an intermittent power source 32. It should also be noted that intermittent power source 32 may be part of integrated circuit 22 in another embodiment of the present disclosure, while keeping within the spirit and scope of the present disclosure. Controller 24 may further include a prediction algorithm 36; computation circuitry 26 may further include a plurality of sub-units 38 and a plurality of switches 40; storage device 28 may further include a power requirements table 42 and a power history table 44; and power monitor circuit 34 may further include, in one example, a resistor 46, a load 48, an analog-to-digital (A/D) converter 50, and a monitor logic 52.

Controller 24 may be any arrangement of standard control logic for handling the overall operation of integrated circuit 22 of power management prediction system 20. In one example, controller 24 may include a state machine for implementing prediction algorithm 36. Prediction algorithm 36 may be an algorithm for analyzing the power sequence of intermittent power source 32 and dispatching computational operations of integrated circuit 22 in a manner that maximizes the operation of integrated circuit 22 in any given power cycle of intermittent power source 32. More details of the operations of prediction algorithm 36 are provided with reference to FIGS. 2A, 2B, 3A, 3B, 3C, and 4.

By way of example, the computational operations of integrated circuit 22 are represented by the plurality of sub-units 38 of computation circuitry 26. More specifically, FIG. 1 shows, for example, but is not limited to, sub-units 38a, 38b, 38c, 38d, 38e, 38f, 38g, through 38n. Sub-units 38a through 38n may be connected in parallel or in series. Additionally, each sub-unit 38 has an associated switch 40, which is an electronic switch for controlling the power of each sub-unit 38, i.e. turning the power ON or OFF to each sub-unit 38. By way of example, FIG. 1 shows a set of switches 40a, 40b, 40c, 40d, 40e, 40f, 40g, through 40n associated with sub-units 38a, 38b, 38c, 38d, 38e, 38f, 38g, through 38n, respectively.

Storage device 28 may be any low-power non-volatile memory device, such as, but not limited to, a ferroelectric random access memory device (FRAM) of the type sold by Ramtron International Corporation (Colorado Springs, Colo.). The storage capacity of storage device 28 should generally be large to store the information of power requirements table 42 and power history table 44.

Power requirements table 42, which may be stored in storage device 28, contains the minimum power requirement of each computational operation of integrated circuit 22, such as the minimum power requirement of each sub-unit 38 of computation circuitry 26. Because the power requirements of each computational operation is known, the information of power requirements table 42 may be supplied, for example, by the designer of integrated circuit 22. The power requirements may be stored in the form of any user-defined power unit, such as a certain minimum power value (e.g., 10 or 20 milliwatts), that is supplied for one or more user-defined time increments (e.g., a millisecond or a microsecond). For example, if one power unit is defined as 10 milliwatts for a duration of one millisecond and sub-unit 38a requires 20 milliwatts for three milliseconds, then sub-unit 38a requires two power units per each of the three millisecond or a total of six power units (i.e., 2×3=6 power units).

Power history table 44, which may be stored in storage device 28, contains a running log of all power events produced by intermittent power source 32. Each power event of intermittent power source 32 may be, for example, a sequence of power pulses (i.e., power cycles), where each power cycle may be of a certain power intensity and may endure for a certain period of time. In one example, the contents of power history table 44 may include, but is not limited to, a peak value, a peak-to-end value, a start-to-peak value, and the number of peaks of the output voltage of intermittent power source 32. More details of the contents and use of power requirements table 42 and power history table 44 are provided with reference to FIGS. 2A, 2B, 3A, 3B, 3C, and 4.

Clock generator 30 may be any standard clock generator for generating an internal clock of any predetermined frequency to the components of integrated circuit 22, such as controller 24, computation circuitry 26, storage device 28, intermittent power source 32, and power monitor circuit 34. Because the frequency of clock generator 30 is known, the clock cycles of clock generator 30 provide a known time reference within integrated circuit 22.

Intermittent power source 32 may be any power source that is periodic and/or not constant, such as any power source that uses naturally occurring or man-made phenomenon. For example, intermittent power source 32 may be, but is not limited to, a solar-based source such as a photovoltaic array; a fluid dynamics-based source such as a bloodstream or water; a vibration-based source such as a spring or a tuning fork; a wind-based source such as a wind turbine; or, in the case of integrated circuit 22 being an RFID tag, an RF-based source; all of which may be intermittent power sources because they provide energy periodically and not continuously. The output of intermittent power source 32 is typically, but not necessarily, electrically connected to all active components of integrated circuit 22, such as to controller 24, computation circuitry 26, storage device 28, clock generator 30, and power monitor circuit 34.

Power monitor circuit 34 may be any known circuit for measuring a power source over time. The specific instance of power monitor circuit 34 that is shown in FIG. 1 is only exemplary. In the example of FIG. 1, one side of resistor 46, which may be a one-ohm resistor, is electrically connected to the output of intermittent power source 32. The opposite side of resistor 46 is electrically connected to load 48, which may be any highly resistive load. A/D converter 50 is electrically connected across resistor 46 and converts the analog voltage across resistor 46 to a digital value. The digital output of A/D converter 50 feeds an input of monitor logic 52. Monitor logic 52 may be digital logic that is used to accumulate data regarding the output of intermittent power source 32 over time (e.g., accumulate voltage data across or current data through resistor 46) over one or more time periods as determined, for example, by counting clock cycles of clock generator 30 in order to establish a time reference and/or duration. The data that is accumulated by monitor logic 52 is fed into and stored within power history table 44 in storage device 28. Thus, a representation of the characteristics of the power cycles generated by intermittent power source 32 may be captured for subsequent analysis by prediction algorithm 36.

Referring again to FIG. 1, the operation of power management prediction system 20 is as follows. The power requirements of sub-units 38 of computation circuitry 26 may be preloaded into power requirements table 42 of storage device 28. Power management prediction system 20 experiences a "learning" operation by which the characteristics of a sequence of multiple power cycles of intermittent power source 32 are captured by power monitor circuit 34 and stored in power history table 44 of storage device 28. A time reference for the sequence of multiple power cycles of intermittent power source 32 may be provided by use of clock generator 30. Subsequently, prediction algorithm 36 of controller 24 performs an analysis of the contents of power history table 44 in order to determine the time duration and intensity of each power cycle and, thus, determine whether a repeatable sequence of power cycles has occurred. Assuming that a repeatable power sequence is detected, prediction algorithm 36, in combination with controller 24, determines which sub-unit 38 may be executed in a given power cycle of the power sequence by matching the power requirements of each sub-unit 38 to the actual available power, as stored in power history table 44. Consequently, prediction algorithm 36 is able to predict the duration and power intensity of a current power cycle and, subsequently, dispatch the execution of one or more computational operations (i.e., one or more sub-units 38) that correspond to the predicted current power cycle. When the execution of any given sub-unit 38 is dispatched, its corresponding switch 40 is activated to receive power in the corresponding sub-unit. In this way, the probability of completing the execution of selected sub-units 38 increases and, thus, the operation of integrated circuit 22 is maximized in a given power cycle, despite operating in an intermittent power environment. Example detected power sequences and process dispatch operations are provided with reference to FIGS. 2A, 2B, 3A, 3B, and 3C. Additionally, more details of the operation of power management prediction system 20 are provided with reference to FIG. 4.

FIGS. 2A and 2B illustrate first and second process dispatch tables 60 and 62, respectively, for a first example power sequence of intermittent power source 32, in order to demonstrate examples of dispatching computational operations by use of power management prediction system 20.

In a first example, process dispatch table 60 of FIG. 2A shows a collection of "POWER CYCLES" T01 through T38. T01 through T38 are each a single time slice, such as, but not limited to, one millisecond or one microsecond. Additionally, process dispatch table 60 shows an example sequence of "AVAILABLE POWER (PWR) UNITS." More specifically, process dispatch table 60 shows a sequence of "00000555550000055555500000555555500000" for T01 through T38, that indicates the occurrence of three power events of 5+5+5+5+5+5 each, where "0" indicates no power present and "5" indicates power present with an intensity of 5 user-defined power units (i.e., T06-T11, T17-T22, and T28-T33 represent three power events of 5+5+5+5+5+5 available power units each). Referring again to FIG. 1, if, in this example and based on the information stored in power requirements table 42, sub-units 38a, 38b, and 38c each require a sequence of 5+5 power units and sub-units 38d, 38e, and 38f each require a sequence of 5+5+5 power units, process dispatch table 60 of FIG. 2A shows one example dispatch sequence in the form of "SUB-UNITS EXECUTED." More specifically and if sub-units 38a, 38b, 38c, 38d, 38e, and 38f are shown in process dispatch table 60 as A, B, C, D, E, and F, respectively, T06-T11 is dispatched by prediction algorithm 36 as AABBCC, T17-T22 is dispatched as DDDEEE, and T28-T33 is dispatched as FFF---. In this example, the "CONSUMED PWR UNITS" of T06-T11, T17-T22, and T28-T33 are 555555, 555555, and 555000, respectively, and the "SURPLUS PWR UNITS" for T06-T11, T17-T22, and T28-T33 are 000000, 000000, and 000555, respectively.

Alternatively, process dispatch table 62 of FIG. 2B shows the same example sequence of "AVAILABLE PWR UNITS" of "00000555550000055555500000555555500000" for T0 through T38. Additionally, if sub-units 38a, 38b, and 38c each require a sequence of 5+5 power units and sub-units 38d, 38e, and 38f each again require a sequence of 5+5+5 power units, process dispatch table 62 shows an alternative dispatch sequence, as determined by prediction algorithm 36. In this example, process dispatch table 62 shows that T06-T11 is dispatched by prediction algorithm 36 as AADDD-, T17-T22 is dispatched as BBEEE-, and T28-T33 is dispatched as CCFFF-. In this example, the "CONSUMED PWR UNITS" of T06-T11, T17-T22, and T28-T33 are 555550, 555550, and 555550, respectively, and the "SURPLUS PWR UNITS" for T06-T11, T17-T22, and T28-T33 are 000005, 000005, and 000005, respectively.

In the examples of process dispatch tables 60 and 62, the execution of sub-units 38a, 38b, 38c, 38d, 38e, and 38f may be dispatched by prediction algorithm 36 in a distributed way across the three power events of the example "AVAILABLE PWR UNITS" in such a way as to ensure the completion thereof, despite the intermittent power environment. This is possible because the information that is stored in power history table 44 allows prediction algorithm 36 to calculate the various combinations of sub-units 38 that may be executed in any given power event of a power sequence, which has been predetermined to be repeatable.

FIGS. 3A, 3B, and 3C illustrate first, second, and third process dispatch tables 64, 66, and 68, respectively, for a second example power sequence of intermittent power source 32, in order to demonstrate examples of dispatching computational operations by use of power management prediction system 20.

In a first example, process dispatch table 64 of FIG. 3A shows a collection of "POWER CYCLES" T01 through T37. T01 through T37 are each a single time slice, such as, but not limited to, one millisecond or one microsecond. Additionally, process dispatch table 64 shows an example sequence of "AVAILABLE PWR UNITS." More specifically, process dispatch table 64 shows a sequence of "0000135753100001357531000013575310000" for T01 through T37, that indicates the occurrence of three power events of 1+3+5+7+5+3+1 each, where "0" indicates no power present and "1," "3," "5," and "7" indicate power present with an intensity of 1, 3, 5, and 7, respectively, user-defined power units (i.e., T05-T11, T16-T22, and T27-T33 represent three power events of 1+3+5+7+5+3+1 available power units each). Referring again to FIG. 1, if, in this example and based on the information stored in power requirements table 42, sub-units 38a, 38b, and 38c each require a sequence of 2+2 power units and sub-units 38d, 38e, and 38f each require a sequence of 3+3+3 power units, process dispatch table 64 of FIG. 3A shows one example dispatch sequence in the form of "SUB-UNITS EXECUTED." More specifically and if sub-units 38a, 38b, 38c, 38d, 38e, and 38f are shown in process dispatch table 60 as A, B, C, D, E, and F, respectively, prediction algorithm 36 dispatches two computational operations in parallel as follows: T05-T11 is dispatched as -AABB-- in parallel with --DDD--, T16-T22 is dispatched as -CC---- in parallel with --EEE--, and T27-T33 is dispatched as ------- in parallel with --FFF--. In this example, the "CONSUMED PWR UNITS" of T06-T11, T17-T22, and T28-T33 are 0255500, 0253300, and 0333000, respectively, and the "SURPLUS PWR UNITS" for T06-T11, T17-T22, and T28-T33 are 1102031, 1104231, and 1024531, respectively.

Alternatively, process dispatch table 66 of FIG. 3B shows the same example sequence of "AVAILABLE PWR UNITS" of "0000135753100001357531000013575310000" for T01 through T37. Additionally, if sub-units 38a, 38b, and 38c each again require a sequence of 2+2 power units and sub-units 38d, 38e, and 38f each again require a sequence of 3+3+3 power units, process dispatch table 66 shows an alternative dispatch sequence, as determined by prediction algorithm 36. In this example, prediction algorithm 36 again dispatches two computational operations in parallel as follows. T05-T11 is dispatched as -AA---- in parallel with --DDD--, T16-T22 is dispatched as -BB---- in parallel with --EEE--, and T27-T33 is dispatched as -CC---- in parallel with --FFF--. In this example, the "CONSUMED PWR UNITS" of T06-T11, T17-T22, and T28-T33 are 0253300, 0253300, and 0253300, respectively, and the "SURPLUS PWR UNITS" for T06-T11, T17-T22, and T28-T33 are 1104231, 1104231, and 1104231, respectively.

Alternatively, process dispatch table 68 of FIG. 3C shows the same example sequence of "AVAILABLE PWR UNITS" of "00001357531000013575310000135753100000" for T01 through T37. Additionally, if sub-units 38a, 38b, and 38c each again require a sequence of 2+2 power units and sub-units 38d, 38e, and 38f each again require a sequence of 3+3+3 power units, process dispatch table 66 shows an alternative dispatch sequence, as determined by prediction algorithm 36. In this example, prediction algorithm 36 dispatches computational operations as follows: T05-T11 is dispatched as -AADDD-, T16-T22 is dispatched as -BBEEE-, and T27-T33 is dispatched as -CCFFF-. In this example, the "CONSUMED PWR UNITS" of T06-T11, T17-T22, and T28-T33 are 0253300, 0253300, and 0253300, respectively, and the "SURPLUS PWR UNITS" for T06-T11, T17-T22, and T28-T33 are 1134201, 1134201, and 1134201, respectively.

In the examples of process dispatch tables 64, 66, and 68, the execution of sub-units 38a, 38b, 38c, 38d, 38e, and 38f is dispatched by prediction algorithm 36 in a distributed way across the three power events of the example "AVAILABLE PWR UNITS" in such a way as to ensure the completion thereof, despite the intermittent power environment. This is possible because the information that is stored in power history table 44 allows prediction algorithm 36 to calculate the various combinations of sub-units 38 that may be executed in any given power event of a power sequence, which has been predetermined to be repeatable.

Figure 4:
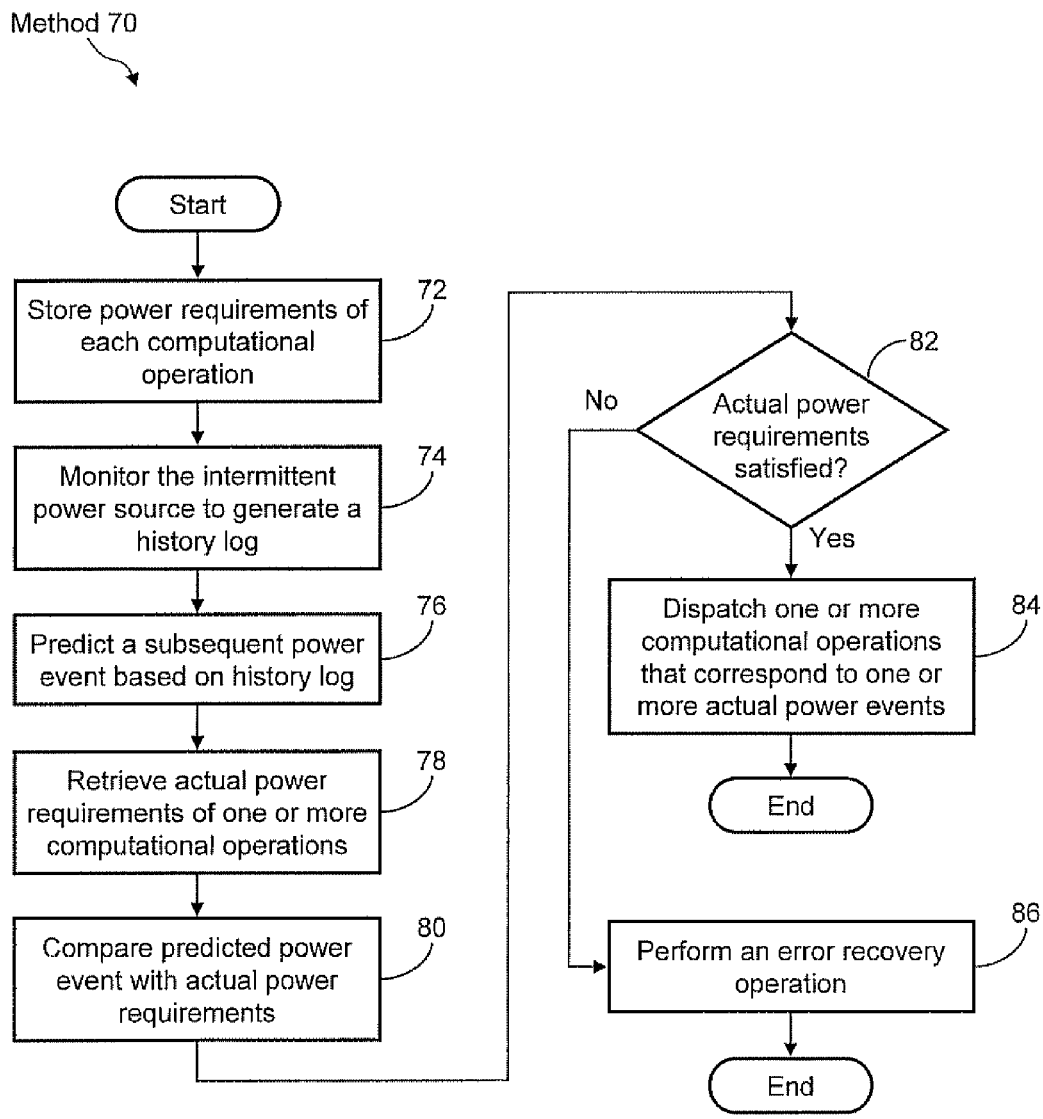
FIG. 4 is a flow diagram of a method of predicting power events in an intermittent power environment and dispatching computational operations by use of the power management prediction system of FIG. 1.

FIG. 4 illustrates a flow diagram of a method 70 of predicting power events in an intermittent power environment and dispatching computational operations by use of power management prediction system 20 of FIG. 1. Method 70 includes, but is not limited to, the following steps.

At step 72, the known power requirements of each computational operation, such as each sub-unit 38, may be stored in power requirements table 42 in storage device 28. For example, a power requirement of 20 milliwatts for a duration of 3 milliseconds may be required to execute the computational operation that is represented by sub-unit 38a. Method 70 proceeds to step 74.

At step 74, the intermittent power source, such as intermittent power source 32, may be monitored for any user-defined period of time by any conventional means, such as by, but not limited to, power monitor circuit 34, in order to generate a history log, which is stored in power history table 44 in storage device 28. Method 70 proceeds to step 76.

At step 76, a current or subsequent power event, n, may be predicted by prediction algorithm 36 of controller 24 based on the knowledge of one or more previous (e.g., n−1 to n−x) power events stored in power history table 44 in storage device 28. Method 70 proceeds to step 78.

At step 78, prediction algorithm 36 of controller 24 retrieves the actual power requirements of one or more computational operations (e.g., one or more sub-units 38) from power requirements table 42 in storage device 28. Method 70 proceeds to step 80.

At step 80, under the control of prediction algorithm 36 of controller 24, the predicted power event, as determined by analyzing the contents of power history table 44, and the actual power requirements, as retrieved by power requirements table 42, may be compared in order to determine whether the predicted power event is suitable (e.g., in intensity and duration) to satisfy the actual power requirements of one or more sub-units 38. In doing so, the characteristics of the current power event may be compared against those from the predicted power event. Method 70 proceeds to step 82.

At decision step 82, if is it determined that a predicted power event satisfies the actual power requirements of at least one sub-unit 38, method 70 proceeds to step 84. However, if is it determined that the predicted power event does not satisfy the actual power requirements of at least one sub-unit 38, method 70 proceeds to step 86.

At step 84, prediction algorithm 36 of controller 24 may dispatch one or more computational operations, e.g., one or more sub-units 38, that correspond to one or more actual power events of intermittent power source 32. Method 70 ends.

At step 86, in the case of an incorrect prediction, power management prediction system 20, under the control of prediction algorithm 36 of controller 24, may perform an error recovery operation. For example, prediction algorithm 36 may treat the current power event as a new power event and, thus, prediction algorithm 36 enters a training mode. In this situation (such as at initialization of the system), the characteristics of the current power event are analyzed and stored in power history table 44. The current processing occurs normally, except that the results of every stage (clock cycle of clock generator 30) may be stored into storage device 28. Although this may be an inefficient use of the available power, the power used for processing will not be wasted if the next cycle does not complete. Method 70 ends.

In summary and referring to FIGS. 1 through 4, power management prediction system 20 and method 70 provide a means for predicting power events in an intermittent power environment and dispatching computational operations of an integrated circuit accordingly. In particular, power management prediction system 20 executes computational operations in an intermittent power environment by storing information on previous power events in power history table 44 of storage device 28 and using this information to predict (via prediction algorithm 36) the strength and duration of a present power event upon detection. Power management prediction system 20 uses the prediction, as well as stored data (e.g., power consumption statistics) on each sub-unit 38 per computational operation, in order to determine the amount of computation to be performed in the present cycle. Subsequently, power management prediction system 20 dispatches sequentially or in parallel to the appropriate logical sub-units 38. Should the power event prediction be incorrect, provision is made for the storage of intermediate data in storage device 28 for recovery.

An exemplary embodiment has been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A power management prediction system for use with a power source that produces power events, the system comprising:
    a monitor connectable to the power source for monitoring the power source and producing a power history table of power events previously produced by the power source;
    computation circuitry;

a power requirements table containing power requirements information for said computational circuitry; and a controller connected to said computation circuitry, said power history table and said power requirements table, said controller calculating a predicted power cycle based on said power events in said power history table and enabling power to said computation circuitry based on said predicted power cycle and said power requirements information.

2. A system of claim 1, wherein said computation circuitry includes a plurality of sub-units.

3. A system of claim 2, wherein said computation circuitry further includes a plurality of corresponding switches associated with each of said plurality of sub-units, said switches controlling power to each of said plurality of sub-units.

4. A system of claim 2, wherein said plurality of sub-units are in a series arrangement.

5. A system of claim 2, wherein said plurality of sub-units are in a parallel arrangement.

6. A system of claim 2, wherein said controller simultaneously enables power to at least two of said plurality of sub-units.

7. A system of claim 1, further comprising a clock generator in communication with said controller and said computation circuitry.

8. A system of claim 1, wherein said controller includes a prediction algorithm that is used in calculating said predicted power cycle.

9. A system of claim 1, wherein the power source includes an intermittent power source.

10. A system of claim 9, wherein said intermittent power source includes a RF-based source.

11. A system of claim 9, wherein said intermittent power source includes a vibration-based source.

12. A system of claim 9, wherein said intermittent power source includes a solar-based source.

13. A system of claim 9, wherein said intermittent power source includes a fluid dynamics-based source.

14. A system of claim 1, further comprising a storage device for storing said power history table and said power requirements table.

15. A system of claim 1, wherein said monitor determines one or any of the following for an output of said power source: a peak value, a peak-to-end value, a start-to-peak value, and a number of peaks.

16. A power system with power management prediction capabilities, the power system comprising:

an intermittent power source;

a power monitor connected to said intermittent power source for monitoring said intermittent power source and producing a power history table of power events previously produced by said intermittent power source;

computation circuitry having a plurality of sub-units, said computation circuitry is powered by said intermittent power source;

a power requirements table containing power requirements information for said plurality of sub-units in said computational circuitry; and a controller connected to said power history table and said power requirements table, said controller calculating a predicted power cycle based on said power events in said power history table and enabling power to said plurality of sub-units in said computation circuitry based on said predicted power cycle and said power requirements information.

17. A system of claim 16, wherein said plurality of sub-units are arranged either in series or parallel.

18. A method of managing power prediction for computational operations, the method comprising:

storing a set of power requirements for one or more computational operations;

monitoring a power source and creating a power history table of power events previously produced by the power source;

predicting a subsequent power event based on power events in the power history table;

retrieving the set of power requirements for one or more computational operations; and comparing the set of power requirements with power events in the power history table to determine if the set of power requirements are met for one or more computational operations.

19. A method of claim 18, the method further comprising:

dispatching one or more computational operations based on the predicted power event when the set of power requirements are met.

20. A method of claim 18, method further comprising:

performing an error recovery operation to ensure process integrity when the set of power requirements are not met.

* * * * *